(12) United States Patent  
Ohshita

(10) Patent No.: US 8,390,571 B2  
(45) Date of Patent: Mar. 5, 2013

(54) POINTING DEVICE CAPABLE OF DETERMINING CURSOR-SPEED

(75) Inventor: Kazuhito Ohshita, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 890 days.

(21) Appl. No.: 12/496,820

(22) Filed: Jul. 2, 2009

(65) Prior Publication Data

US 2010/0007605 A1    Jan. 14, 2010

(30) Foreign Application Priority Data

Jul. 10, 2008  (JP) .................................. 2008-179660

(51) Int. Cl.
G09G 5/08  (2006.01)
(52) U.S. Cl. ....................................................... 345/159
(58) Field of Classification Search .......... 345/156–157, 345/161, 167, 856; 455/566
See application file for complete search history.

(56) References Cited

U.S. PATENT DOCUMENTS

| | | | | |
|---|---|---|---|---|
| 5,973,668 A | * | 10/1999 | Watanabe | 345/157 |
| 6,002,388 A | * | 12/1999 | Seffernick et al. | 345/161 |
| 6,137,474 A | * | 10/2000 | Komatsu | 345/161 |
| 6,331,849 B1 | * | 12/2001 | VandenBoom | 345/161 |
| 7,672,692 B2 | * | 3/2010 | Nishino et al. | 455/566 |
| 2001/0012025 A1 | * | 8/2001 | Wojaczynski et al. | 345/856 |

FOREIGN PATENT DOCUMENTS

JP    09-034644    2/1997

* cited by examiner

*Primary Examiner* — Chanh Nguyen
*Assistant Examiner* — James Nokham
(74) *Attorney, Agent, or Firm* — Hunton & Williams LLP

(57) ABSTRACT

A pointing device includes an operation body that operates a cursor moving on a display screen, a detection unit that detects an operating force applied to the operation body, a cursor control unit that generates cursor movement data according to the operating force, a communication control unit that outputs the cursor movement data to the outside, and a central control unit that controls the operation of the units. The cursor control unit includes a cursor-speed determining unit and a recording unit. The cursor-speed determining unit determines cursor moving speed in an X-Y plane direction by a predetermined reference function from an operating force in an X-Y plane direction and an operating force in a perpendicular z axis direction perpendicular to the X-Y plane direction that are detected by the detection unit. The recording unit stores the reference function. The cursor-speed determining unit changes the reference function in accordance with the magnitude of the operating force in the perpendicular Z axis direction, and determines the cursor moving speed in the X-Y plane direction by the changed function.

3 Claims, 3 Drawing Sheets

POINTING DEVICE CAPABLE OF DETERMINING CURSOR-SPEED

CROSS REFERENCE TO RELATED

The present invention contains subject matter related to and claims the benefit of Japanese Patent Application No. 2008-179660 filed in the Japanese Patent Office on Jul. 10, 2008, the entire contents of which is incorporated herein by reference.

BACKGROUND OF THE DISCLOSURE

1. Technical Field

The present invention relates to a pointing device that controls the motion of a cursor moving on a screen, and more particularly, to a pointing device that changes the cursor moving speed in accordance with an operating force.

2. Related Art

When an operator operates a pointing device, the moving distance, the direction, and the speed of a cursor are generally adjusted by the magnitude of a force applied to an operation body of the pointing device.

For example, Japanese Unexamined Patent Application Publication No. 9-34644 discloses a pointing device that changes a function to be used for each magnitude range of a force applied to the pointing device and determines cursor moving speed according to the applied force. A previously set function is used as a reference function that reflects a signal which generates the cursor moving speed in X and Y directions.

However, in the pointing device disclosed in Japanese Unexamined Patent Application Publication No. 9-34644, in the determination of cursor moving speed, the reference function is configured to depend on only the magnitude of an operating force in the X-Y plane direction on an X-Y plane, and a component in the perpendicular (Z axis) direction was not reflected.

That is, if the same operating force was applied to the pointing device in the X-Y plane direction, a cursor was moved on a computer screen at the same speed when the operation body was operated so as to be strongly pushed in the perpendicular (z axis) direction as when the operation body was operated so as to be lightly touched.

For this reason, for example, an operator (beginner), who is poor at operating, does not know about the increase and decrease of the force applied to the operation body. Accordingly, a beginner may operate the pointing device with an extremely small or large force. In addition, since it is typical that a beginner feels that the cursor moving speed is high during the operation, there is a problem in that it is very difficult to move a cursor to a target position.

Meanwhile, an operator (expert), who is good at operating, can operate the operation body by lightly touching the operation body without applying an excessive force. However, a cursor moving speed, which is felt to be high by a beginner, may be felt to be low by an expert, and the expert cannot instantly move the cursor to a target position. For this reason, an expert may be often dissatisfied.

Since respective operators have different habits as described above, there has been a limit on obtaining operability that could satisfy all operators.

These and other drawbacks exist.

SUMMARY

An advantage of various embodiments is to provide a pointing device that improves operability by reflecting an operating force in a perpendicular (Z axis) direction in the cursor moving speed in an X-Y plane direction.

According to an exemplary embodiment, a pointing device includes an operation body that operates a cursor moving on a display screen, a detection unit that detects an operating force applied to the operation body, a cursor control unit that generates cursor movement data according to the operating force, a communication control unit that outputs the cursor movement data to the outside, and a central control unit that controls the operation of the units. The cursor control unit includes a cursor-speed determining unit and a recording unit. The cursor-speed determining unit determines cursor moving speed in an X-Y plane direction by a predetermined reference function from an operating force in an X-Y plane direction and an operating force in a perpendicular Z axis direction perpendicular to the X-Y plane direction that are detected by the detection unit. The recording unit stores the reference function. The cursor-speed determining unit changes the reference function in accordance with the magnitude of the operating force in the perpendicular Z axis direction, and determines the cursor moving speed in the X-Y plane direction by the changed function.

In this embodiment, the cursor moving speed in the plane direction is not simply determined on the basis of a perpendicular operating force. A predetermined function, which has been previously prepared, is changed using the perpendicular operating force, and the cursor moving speed is determined on the basis of the changed function. Accordingly, it may be possible to improve the operability of the pointing device.

In the pointing device, if the magnitude of the operating force fZ in the perpendicular Z axis direction is denoted by F0, F1, F2, and F3 ($0 \leq F0 < F1 < F2 < F3$) in respective stages, a first input range may be defined by $F0 \leq fZ < F1$ in accordance with the magnitude of the operating force fZ, a second input range may be defined by $F1 \leq fZ < F2$, a third input range may be defined by $F2 \leq fZ < F3$, and a fourth input range may be defined by $F3 \leq fZ$. The reference function may include a first speed function, a second speed function, and a third speed function. The first speed function is gradually increased from 0 in the first and second input ranges. The second speed function has a gradient, which is larger than 0 and smaller than a differential value ($dv/dfZ$; v is cursor moving speed) at an end portion of the second input range, in the third input range. The third speed function has a gradient, which is larger than the gradient of the second speed function and smaller than 1, in the fourth input range. The cursor moving speed may be determined on the basis of the operating force that is input to the reference function.

The reference function is obtained from an empirical rule that is based on a plurality of data samples. Since the cursor moving speed is determined from a perpendicular operating force on the basis of the reference function, the pointing device may be made better in terms of its operability.

For example, the cursor control unit may be combined with the central control unit as firmware. Also, the cursor control unit may be provided as driver software, and an external computer may be provided with the driver software.

A pointing device corresponding to the former case may be provided as a pointing device that is provided with a cursor control unit, and may be easily mounted on a small device, such as a mobile phone, with a small memory capacity. Meanwhile, a pointing device corresponding to the latter case may be provided for a computer or the like, which has relatively large memory capacity, in the form where the driver software is installed separately from the pointing device body.

According to various embodiments, it may be possible to determine the cursor moving speed in an X-Y plane direction after an operating force applied in a Z axis direction is reflected.

Further, since the function, which converts the operating force into the cursor moving speed, may be selected in accordance with the magnitude of an operating force applied in a Z axis direction, the pointing device may be made better in terms of its operability.

DESCRIPTION OF EXEMPLARY EMBODIMENTS

Figure 1:
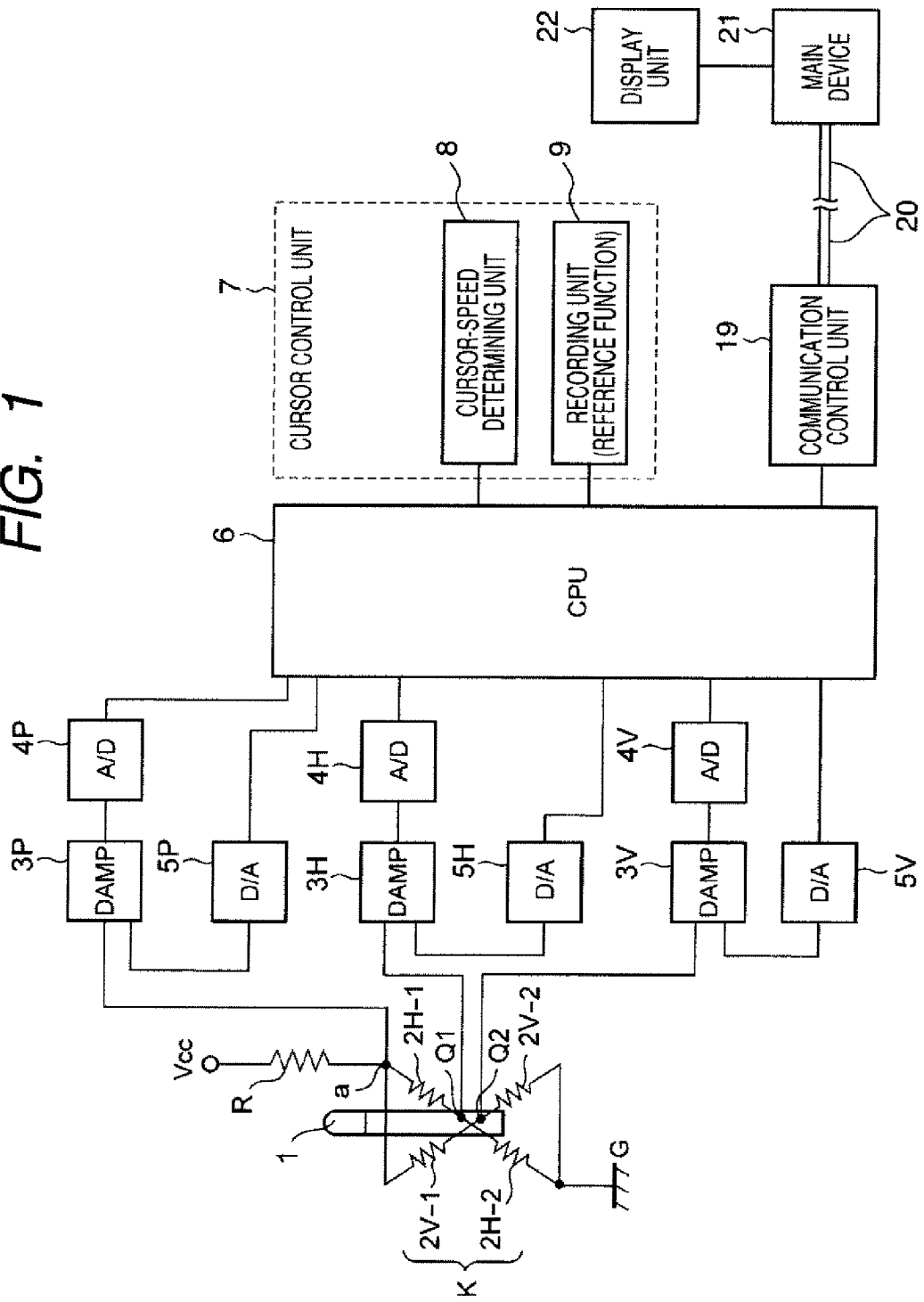
FIG. 1 is a block diagram of a pointing device, which includes a stick-type operation unit, according to an embodiment of the disclosure.
Figure 2:
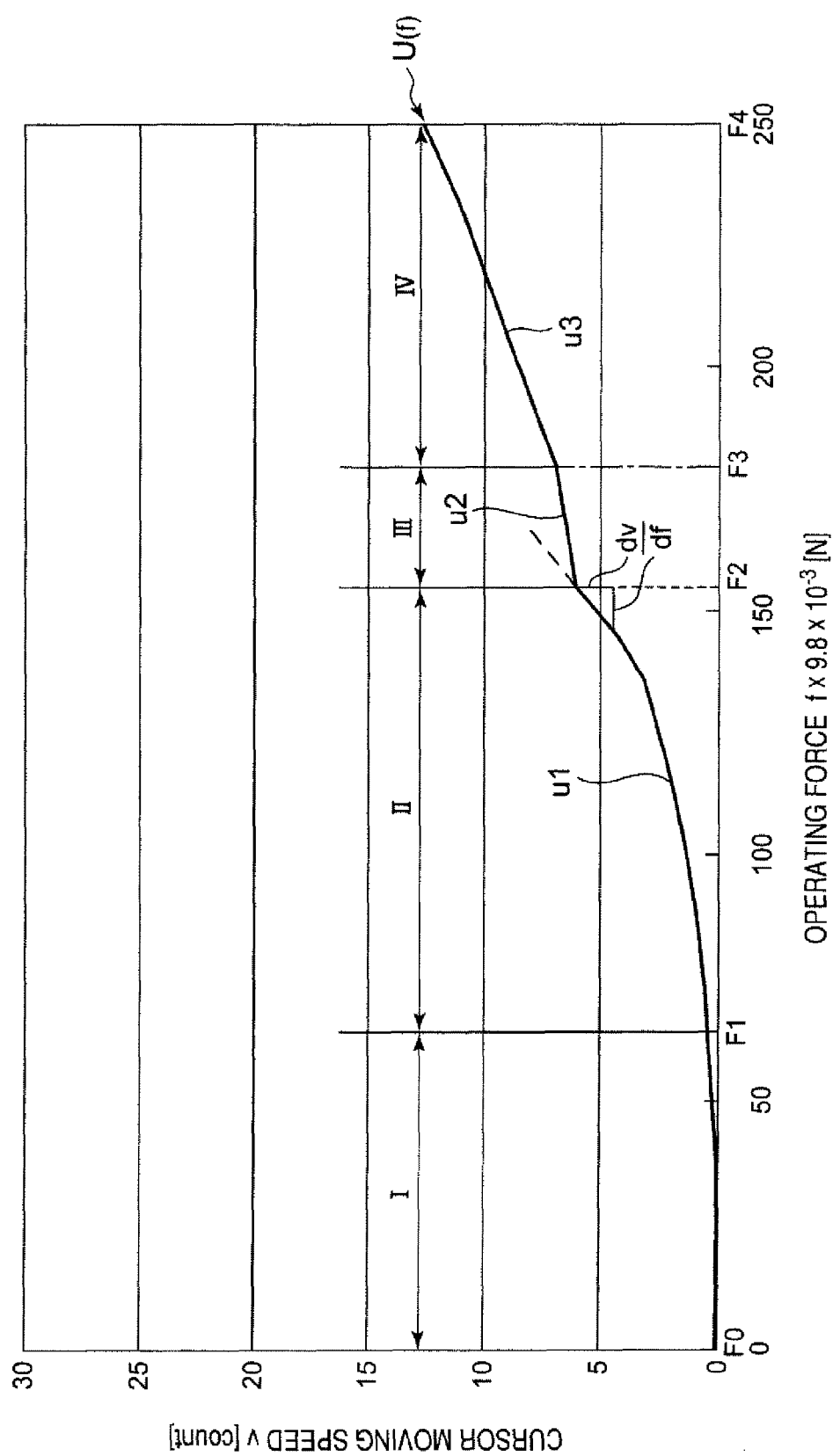
FIG. 2 is a graph illustrating a reference function that defines a relationship between an operating force and cursor moving speed.

The following description is intended to convey a thorough understanding of the embodiments described by providing a number of specific embodiments and details involving pointing devices. It should be appreciated, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending on specific design and other needs. FIG. 1 is a block diagram of a pointing device, which includes a stick-type operation unit, according to various embodiments. FIG. 2 is a graph illustrating a reference function that defines a relationship between an operating force and cursor moving speed. Meanwhile, in FIG. 2, the horizontal axis represents an operating force f that is applied to the stick-type operation unit in an X-Y plane direction and the vertical axis represents cursor moving speed v.

As referred to herein, an X-Y plane direction means a horizontal direction (X axis direction) or a vertical direction (Y axis direction) on an X-Y plane, and a perpendicular direction means a Z axis direction perpendicular to the X-Y plane.

As shown in FIG. 1, two horizontal strain gauges (pressure detecting sensors) 2H-1 and 2H-2 may be attached to both sides of a root portion of a stick-type operation unit (pointing device) 1 in a horizontal direction (X axis direction). Likewise, two vertical strain gauges (pressure detecting sensors) 2V-1 and 2V-2 may be attached to both sides of the root portion in a vertical direction (Y axis direction) The two horizontal strain gauges 2H-1 and 2H-2 may be connected to each other in series between a ground point G and a connecting portion "a" that is formed at one end of a resistor R. The two vertical strain gauges 2V-1 and 2V-2 also may be connected to each other in series between the ground point G and the connecting portion "a" that is formed at one end of the resistor R. Further, resistors of the horizontal strain gauges 2H-l and 2H-2 that are connected to each other in series, and resistors of the vertical strain gauges 2V-1 and 2V-2 that are connected to each other in series may be connected to each other in parallel between the connecting portion "a" and the ground point G.

If the end of the stick-type operation unit 1 is operated in the X-Y plane direction by the tip of an operator's finger, the head of the stick-type operation unit may be swung about a base end of the stick-type operation unit, so that the stick-type operation unit 1 as a whole is tilted. In this case, in the stick-type operation unit 1, resistance values of the horizontal strain gauges 2H-1 and 2H-2 relatively may change according to the magnitude and polarity of a horizontal component of the operating force. Likewise, resistance values of the vertical strain gauges 2V-1 and 2V-2 also relatively change according to the magnitude and polarity of a vertical component of the operating force.

Further, if an operating force is applied to the stick-type operation unit 1 in the perpendicular direction (Z axis direction), the horizontal strain gauges 2H-1 and 2H-2 and the vertical strain gauges 2V-1 and 2V-2 may be compressed at the same time. Accordingly, the resistance values of the horizontal strain gauges 2H-1 and 2H-2 and the resistance values of the vertical strain gauges 2V-1 and 2V-2 may change so as to be decreased (or increased) at the same time. For this reason, this may change the resistive voltage-division ratio between the resistor R and the resultant resistance K of the resistance values of the horizontal strain gauges 2H-1 and 2H-2 and the vertical strain gauges 2V-1 and 2V-2, which may be connected in parallel.

One input of a horizontal differential amplifier (DAMP) 3H may be connected to a connecting point Q1 between the two horizontal strain gauges 2H-1 and 2H-2, and the other input thereof may be connected to the output of a horizontal digital-analog converter (D/A) 5H. One input of a vertical differential amplifier (DAMP) 3V also may be connected to a connecting point Q2 between the two vertical strain gauges 2V-1 and 2V-2, and the other input thereof may be connected to an output of a vertical digital-analog converter (D/A) 5V.

Likewise, one input of a perpendicular differential amplifier (DAMP) 3P may be connected to the connecting portion "a" between the resistor R and the resultant resistance K, and the other input thereof is connected to an output of a perpendicular digital-analog converter (D/A) 5P.

An input of a horizontal analog-digital converter (A/D) 4H may be connected to the output of the horizontal differential amplifier 3H, an input of a vertical analog-digital converter (A/D) 4V also may be connected to the output of the vertical differential amplifier 3V, and an input of a perpendicular analog-digital converter (A/D) 4P also may be connected to an output of the perpendicular differential amplifier 3P.

An input of the horizontal digital-analog converter 5H may be connected to a central control unit (CPU) 6, and an output of the horizontal digital-analog converter may be connected to the other input of the horizontal differential amplifier 3H. An input of the vertical digital-analog converter 5V also may be connected to the central control unit (CPU) 6, and an output of the vertical digital-analog converter may be connected to the other input of the vertical differential amplifier 3V. Further, an input of the perpendicular digital-analog converter 5P also may be connected to the central control unit (CPU) 6, and an output of the perpendicular digital-analog converter may be connected to the other input of the perpendicular differential amplifier 3P.

Furthermore, a cursor control unit 7 may be connected to the central control unit 6. The cursor control unit 7 may include a cursor-speed determining unit 8 and a recording unit 9. A reference function U(f), which is referred when an applied operating force f is converted into cursor moving speed (moving distance (count value) per unit time)) v, may be stored in the recording unit 9 as described below.

An input of a communication control unit 19 may be connected to the central control unit 6. An output of the central control unit 6 may be connected to an input of a main device 21 such as an external personal computer through transmission cables 20, and a display unit 22 such as a display may be connected to the main device 21.

In this case, the reference function U(f) stored in the recording unit 9 may include a plurality of speed functions u, and the speed function u to be applied may vary according to the magnitude range of the applied operating force f. That is, as shown in FIG. 2, the reference function U(f) may include first and second input ranges I and II, a third input range III, and a fourth input range IV. In the first and second input ranges, the cursor moving speed gradually may be increased in accordance with a first speed function u1 that is approximated to an exponential function as the operating force f is increased. In the third input range, the cursor moving speed may be increased in accordance with a linear second speed function u2. The linear second speed function may continue to the first input range I, and may have a gradient that is smaller than a differential value dv/df at an end portion of the first input range 1 and larger than 0. In the fourth input range, the cursor moving speed may be increased in accordance with a linear third speed function u3. The linear third speed function may continue to the third input range III, and may have a gradient that is larger than the second speed function u2 and smaller than 1.

The first input range I is a range that may be applied when the operating force f is smaller than a predetermined operating force F1. The first input range may convert the operating force into the minimum moving speed, which is required to move the cursor, in accordance with the applied operating force f. The second input range II is a range that may be applied when an operating force f larger than that of the first input range I is input, and is a range where the cursor may be moved in accordance with the applied operating force f.

The third input range III is a range that may be applied when a further large operating force f is input, and may prevent overshoot by making the gradient of the second speed function u2 be smaller than the gradient of the first speed function u1 in the second input range II. That is, even when an excessive operating force f is input, the cursor may not be moved in accordance with the applied operating force f and the cursor moving speed v is not rapidly changed.

The fourth input range IV corresponds to a case where a still further large operating force f is input, and is a range where cursor moving speed may be changed to be fast. It may be possible to make a cursor quickly approach a target icon or the like.

When predetermined operating forces F1, F2, and F3 correspond to thresholds, the boundaries between the adjacent input ranges may be determined on the basis of whether the applied operating forces f exceed the respective thresholds.

That is, if equal to or larger than 0 and smaller than F1, the applied operating force f may correspond to the first input range I. Accordingly, the applied operating force may be converted into cursor moving speed v by the first speed function u1 in accordance with the applied operating force f. Further, if equal to or larger than F1 and smaller than F2, the applied operating force may correspond to the second input range II. Accordingly, the applied operating force likewise may be converted into cursor moving speed v by the first speed function u1 in accordance with the applied operating force f.

Furthermore, if equal to or larger than F2 and smaller than F3, the applied operating force f may correspond to the third input range III. Accordingly, the applied operating force may be converted into cursor moving speed v by the second speed function u2. If equal to or larger than F3, the applied operating force may correspond to the fourth input range IV. Accordingly, the applied operating force may be converted into cursor moving speed v by the third speed function u3.

The operation of a data control device of this embodiment will be described below. The operation performed by each of the horizontal components 2H-1, 2H-2, and 3H to 5H may be substantially the same as the operation performed by each of the vertical components 2V-1, 2V-2, and 3V to 5V. Accordingly, the operation performed by each of vertical components 2V-1, 2V-2, and 3V to 5V will be described in the following description of the operation, and the operation performed by each of horizontal components 2H-1, 2H-2, 3H, to 5H will be omitted.

When an operator begins to operate the stick-type operation unit 1, the resultant resistance K of the resistance values of the horizontal strain gauges 2H-1 and 2H-2 and the vertical strain gauges 2V-1 and 2V-2 may be changed in accordance with the degree of operation (the magnitude of an operating force fZ) in the perpendicular direction (Z axis direction). Accordingly, a DC voltage, which may represent the perpendicular operating force fZ of the stick-type operation unit 1, may be generated at the connecting point "a" in accordance with the resistive voltage-division ratio between the resultant resistance K and the resistor R. The DC voltage may be supplied to the perpendicular differential amplifier 3P as vertical load data.

The perpendicular differential amplifier 3P may differentially amplify the DC voltage and a correction value supplied from the perpendicular digital-analog converter 5P, and may generate an analog output voltage corresponding to the difference therebetween. The perpendicular analog-digital converter 4P may convert the analog output voltage of the perpendicular differential amplifier 3P into a digital voltage, and may supply the digital voltage to the central control unit 6 as digital perpendicular load data.

Further, each of the resistance values of the horizontal strain gauges 2H-1 and 2H-2 may be relatively changed in accordance with the degree of operation (the magnitude of an operating force f) that may be applied to the stick-type operation unit 1 in a horizontal operation direction during the operation. A DC voltage, which may represent the operating force at the time of the operation of the stick-type operation unit 1, may be generated at the connecting point between the horizontal strain gauges 2H-1 and 2H-2 in accordance with the change of the resistance values. The DC voltage may be supplied to the horizontal differential amplifier 3H as horizontal load data. The horizontal differential amplifier 3H may differentially amplify the DC voltage and a correction value supplied from the horizontal digital-analog converter 5H, and may generate an analog output voltage corresponding to the difference therebetween. The horizontal analog-digital converter 4H may convert the analog output voltage of the horizontal differential amplifier 3H into a digital voltage, and may supply the digital voltage to the central control unit 6 as digital horizontal load data.

Meanwhile, the horizontal components 2H-1, 2H-2, and 3H to 5H, the vertical components 2V-1, 2V-2, and 3V to 5V, and the perpendicular components R, 3P, and 5P may form a detection unit that may detect vertical, horizontal, and perpendicular operating forces (digital load data).

After that, the central control unit 6 may supply the digital perpendicular load data and the digital horizontal load data to the cursor-speed determining unit 8 of the cursor control unit 7, and may convert the digital perpendicular load data and the digital horizontal load data into digital speed data.

The reference function U(f) is referred in this conversion. In this case, a value, which is obtained by inputting the digital horizontal load data to the reference functions U(f) shown in FIG. 2, may be used as the cursor moving speed as it is. However, in the following description, the reference function U(f) may be changed in accordance with an operator's operating level (whether an operator is a beginner or an expert), that is, with reflection of the digital perpendicular load data, and a value obtained in this case may be used as the cursor moving speed.

Figure 3:
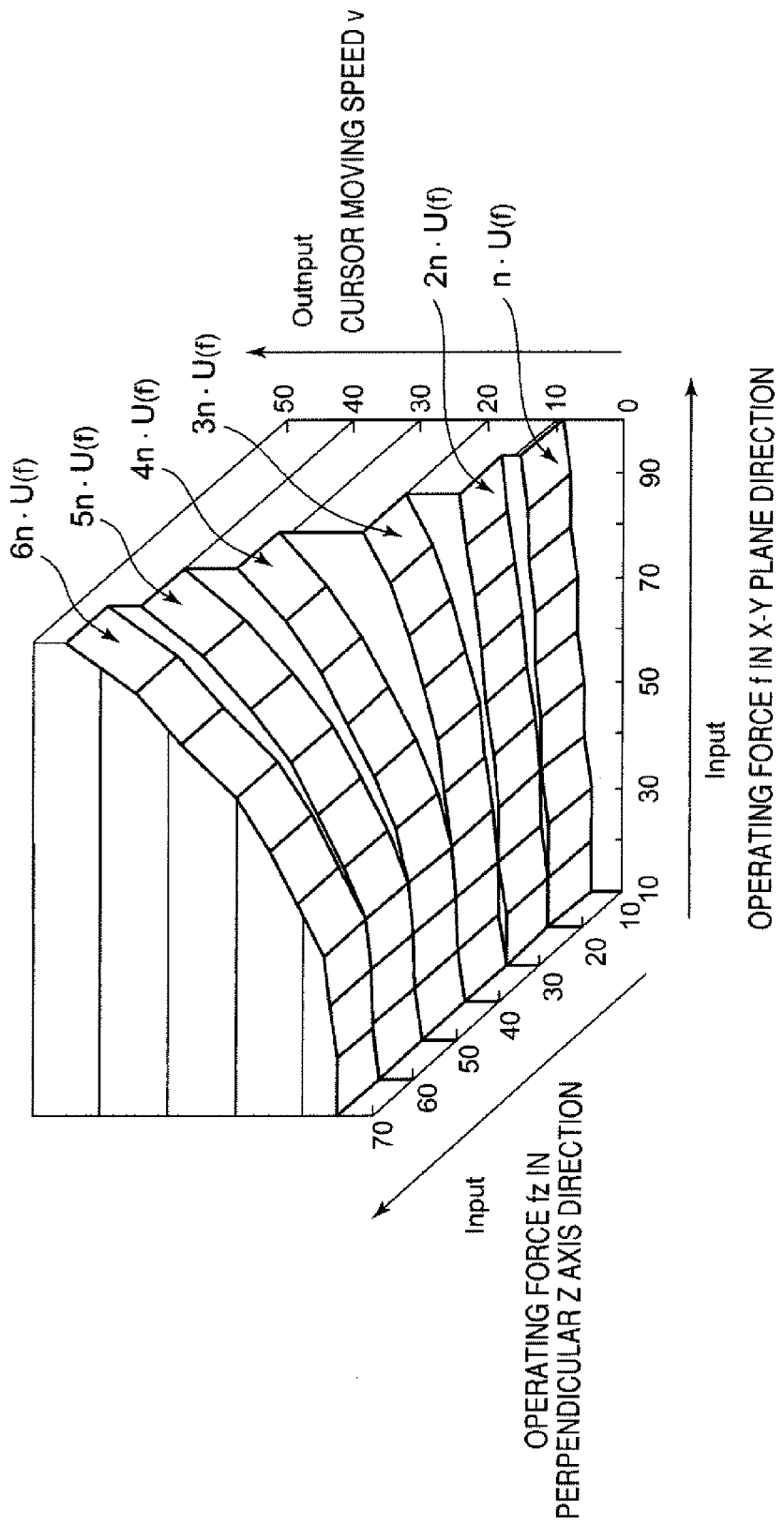
FIG. 3 is a graph illustrating a function that defines a relationship between a perpendicular operating force and cursor moving speed.

FIG. 3 is a graph illustrating a function that defines a relationship between a perpendicular operating force and cursor moving speed. Meanwhile, in an embodiment that uses a graph shown in FIG. 3, only first and second input ranges I and II of the reference functions U(f) shown in FIG. 2 may be used, and the third and fourth input ranges III and IV may not be used.

Further, in this embodiment, the size of the digital perpendicular load data may be divided into predetermined ranges. For example, the operating force f may be divided every, for example, 10 (actually, 10×9.8×10-3[N]) into a range that is approximately equal to or larger than 10 and smaller than 20, a range that is approximately equal to or larger than 20 and smaller than 30, . . . , and a range that is approximately equal to or larger than 60 and smaller than 70. For every range, the cursor moving speed v may be obtained from a modified function, which may be obtained by multiplying the reference function U(f) by a proportional constant n that is approximately equal to or larger than 1.

For example, a function 2U(f) obtained by multiplying the reference function by 2 (n=2) may be selected if the applied perpendicular operating force fZ is approximately equal to or larger than 10 units and smaller than 20 units, and a function 3U(f) obtained by multiplying the reference function by 3 (n=3) may be selected if the applied perpendicular operating force is approximately equal to or larger than 20 units and smaller than 30 units. Likewise, a graph of a function 6U(f) obtained by multiplying the reference function by 6 may be selected if the applied perpendicular operating force fZ is approximately equal to or larger than 60 units and smaller than 70 units. The horizontal cursor moving speed v may be obtained by assigning digital horizontal load data to these functions. Meanwhile, as long as n is a real number that is equal to or larger than 1, n may not be an integer.

Accordingly, as the stick-type operation unit is operated in the horizontal direction while a strong operating force fZ is applied to the stick-type operation unit in the perpendicular direction, n may be increased, so that the gradient of the function nU(fx) may be increased. Therefore, it may be possible to increase the cursor moving speed v. As a result, a beginner or the like, who desires to perform an operation at a low cursor moving speed v, can set the speed of the cursor to the desired speed (low speed) by reducing the perpendicular force. Further, an expert or the like, who desires to perform an operation at a high cursor moving speed v, can set the speed of the cursor to the desired speed (high speed) by increasing the perpendicular force.

In contrast, a function 6U(fx) obtained by multiplying the reference function by 6 may be selected if the applied perpendicular operating force fZ is small (equal to or larger than 10 units and smaller than 20 units), and a function 2U(fx) obtained by multiplying the reference function by 2 may be selected if the applied perpendicular operating force fZ is large (equal to or larger than 60 units and smaller than 70 units). In this case, as the stick-type operation unit 1 may be operated in the horizontal direction by a weaker force (as the perpendicular operating force fZ is decreased), it may be possible to make the cursor moving speed v high. As the stick-type operation unit may be operated by a stronger force, it may be possible to make the cursor moving speed v low.

In this case, an arbitrary value may be selected as the multiple n by operator's selection. Accordingly, it may be possible to define the relationship between the perpendicular operating force fZ and the cursor moving speed v in accordance with the habit of each operator, and to further improve operability.

The central control unit 6 may transmit the converted digital speed data to the main device 21 such as a personal computer through the communication control unit 19 and the transmission cables 20. Further, the main device 21 such as a personal computer moves a cursor on the display unit 22 by the digital speed data that is transmitted from the central control unit 6.

In the above description, the cursor control unit 7 has been mounted on the pointing device that is originally provided with the stick-type operation unit as firmware. However, the cursor control unit may be provided on a main device 21 including an operating system (OS) unlike this. That is, the cursor-speed determining unit 8 and the recording unit 9, which stores the reference function U(f), of the cursor control unit 7 may be provided as driver software (cursor control module), and may be installed on the main device 21 including an OS. Meanwhile, the pointing device includes a pointing device body (which is obtained by removing the cursor control unit 7 from the pointing device) and driver software.

In this case, the central control unit 6 may transmit digital perpendicular load data supplied from the perpendicular analog-digital converter 4P, digital horizontal load data supplied form the horizontal analog-digital converter 4H, and digital vertical load data supplied from the vertical analog-digital converter 4V to the main device 21 such as a personal computer through the communication control unit 19 and the transmission cables 20.

A CPU of the main device 21 such as a personal computer may generate the cursor moving speed v by the digital perpendicular load data, the digital horizontal load data, or the digital vertical load data transmitted form the central control unit 6 of the pointing device, and the driver software (cursor control module) of the cursor control unit 7, as described above. Further, the CPU of the main device 21 moves the cursor on the display unit 22 by the generated cursor moving speed v.

As described above, in a cursor control device of the pointing device according to the various embodiments, the cursor-speed determining unit 8 may select any one function nU(f), which may be obtained by multiplying the reference function U(f) by n, from the magnitude of the perpendicular operating force fZ, and uses a value, which may be obtained by assigning digital horizontal load data fX (or digital vertical load data fY) to the function nU(f), as the cursor moving speed v. Accordingly, the cursor-speed determining unit may determine the cursor moving speed v in accordance with an operator's operating level. As a result, it may be possible to improve operability.

A stick-type pointing device has been described in the above-mentioned embodiment, but the invention is not limited thereto. As long as a pointing device can detect X, Y, and Z axis directions, the pointing device may be another type pointing device such as a capacitance-type pointing device.

Further, the detection of the operating force in the perpendicular Z axis direction has been described by the change of the resistive voltage-division ratio between the resistor R and the resultant resistance K of the resistance values of the horizontal strain gauges 2H-1 and 2H-2 and the vertical strain gauges 2V-1 and 2V-2, which are connected in parallel. However, the invention is not limited thereto, and the degree of operation in the Z axis direction may be directly detected by a strain sensor that is separately provided.

In addition, a case where only the first and second input ranges I and II of the reference functions U(f) shown in FIG. 2 are used and the third and fourth input ranges III and IV are not used has been described in the above-mentioned embodiment. However, the third and fourth input ranges III and IV may be used, and it may be possible to perform wider control in this case.

It should be understood by those skilled in the art that various modifications, combinations, sub-combinations and alterations may occur depending on design requirements and other factors insofar as they are within the scope of the appended claims of the equivalents thereof.

Accordingly, the embodiments of the present inventions are not to be limited in scope by the specific embodiments described herein. Further, although some of the embodiments of the present invention have been described herein in the context of a particular implementation in a particular environment for a particular purpose, those of ordinary skill in the art should recognize that its usefulness is not limited thereto and that the embodiments of the present inventions can be beneficially implemented in any number of environments for any number of purposes. Accordingly, the claims set forth below should be construed in view of the full breadth and spirit of the embodiments of the present inventions as disclosed herein. While the foregoing description includes many details and specificities, it is to be understood that these have been included for purposes of explanation only, and are not to be interpreted as limitations of the invention. Many modifications to the embodiments described above can be made without departing from the spirit and scope of the invention.

What is claimed is:

1. A pointing device comprising:
    an operation body that operates a cursor moving on a display screen;
    a detection unit that detects an operating force applied to the operation body;
    a cursor control unit that generates cursor movement data according to the operating force;
    a communication control unit that outputs the cursor movement data to the outside; and
    a central control unit that controls the operation of at least one of the detection, cursor control, and communication control units,
    wherein the cursor control unit includes a cursor-speed determining unit that determines cursor moving speed in an X-Y plane direction by a predetermined reference function from an operating force in an X-Y plane direction and an operating force in a perpendicular Z axis direction perpendicular to the X-Y plane direction that are detected by the detection unit; and a recording unit that stores the reference function,
    the cursor-speed determining unit changes the reference function in accordance with the magnitude of the operating force in the perpendicular Z axis direction, and determines the cursor moving speed in the X-Y plane direction by the changed function,
    if the magnitude of the operating force fZ in the perpendicular Z axis direction is denoted by $F0, F1, F2$, and $F3$ ($0 \leq F0 < F1 < F2 < F3$) in respective stages, a first input range is defined by $F0 \leq fZ < F1$ in accordance with the magnitude of the operating force fZ, a second input range is defined by $F1 \leq fZ < F2$, a third input range is defined by $F2 \leq fZ < F3$, and a fourth input range is defined by $F3 \leq fZ$,
    the reference function includes a first speed function that is gradually increased from 0 in the first and second input ranges; a second speed function that has a gradient, which is larger than 0 and smaller than a differential value (dv/dfZ; v is cursor moving speed) at an end portion of the second input range, in the third input range; and a third speed function that has a gradient, which is larger than the gradient of the second speed function and smaller than 1, in the fourth input range, and
    the cursor moving speed is determined on the basis of the operating force that is input to the reference function.

2. The pointing device according to claim 1, wherein the cursor control unit is combined with the central control unit as firmware.

3. The pointing device according to claim 1, wherein the cursor control unit is provided as driver software, and an external computer is provided with the driver software.

* * * * *